Patented July 9, 1929.

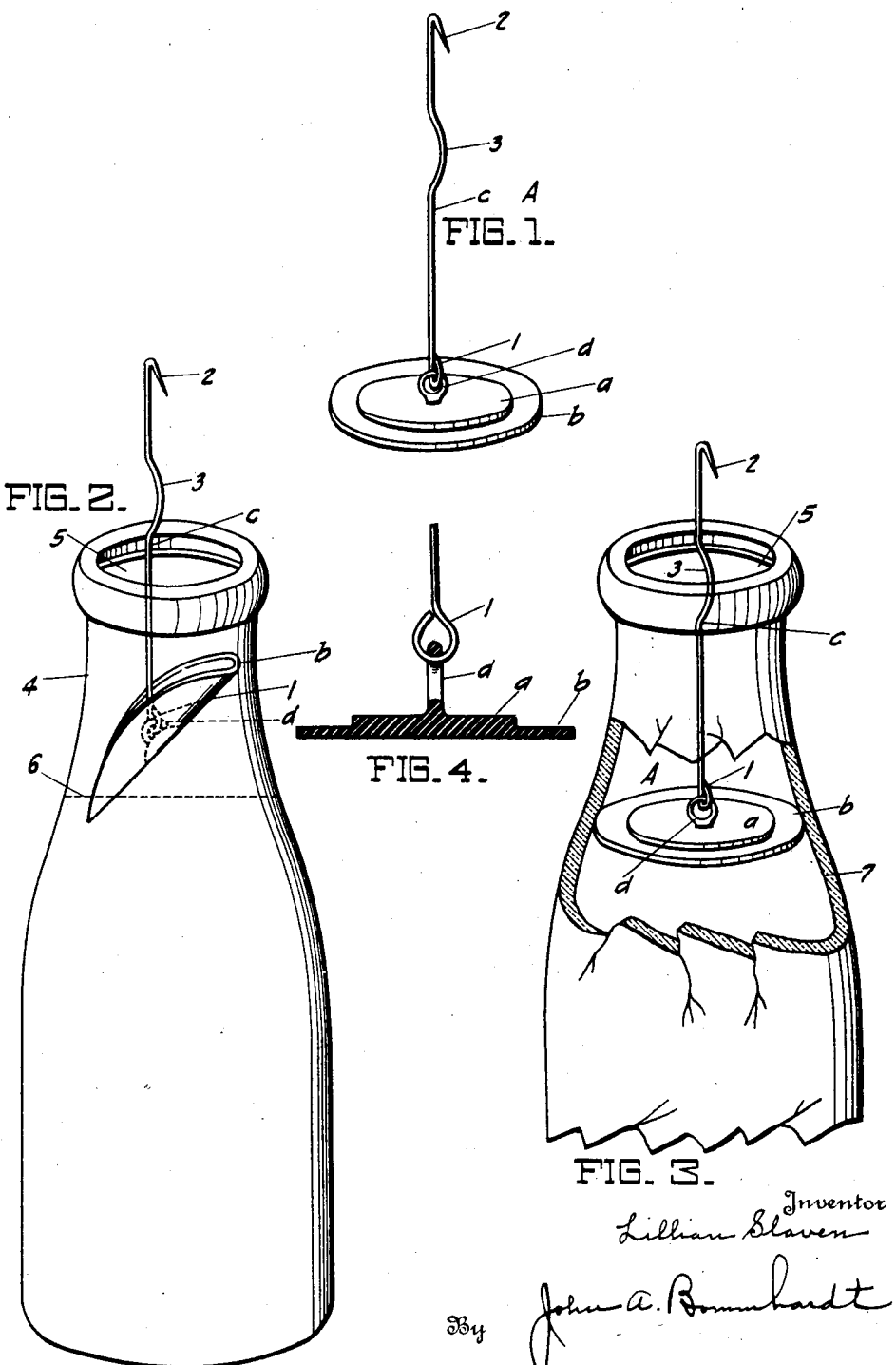

1,720,099

UNITED STATES PATENT OFFICE.

LILLIAN SLAVEN, OF CLEVELAND, OHIO.

LIQUID SEPARATOR.

Application filed July 30, 1928. Serial No. 296,171.

This invention relates to separators, particularly to the type which is adapted for the purpose of separating liquids of different gravities.

A particular object of the invention is the provision of a device whereby cream may be separated from milk and in such a manner that the cream may be readily poured from a bottle without in any manner commingling with milk in the same bottle during such pouring operation.

The invention has for a further object the provision of a separator which is simple in construction, easy to operate, highly sanitary, inexpensive to manufacture, and generally superior in use and serviceability.

With the above and other objects in view, the invention consists in the novel and useful provision, formation, construction, association and relative arrangement of parts, members and features as well as the method of using the invention, all as described in the following detailed description, illustrated in the drawing, and more particularly pointed out in the claim.

In the drawing:

Figure 1 is a perspective view of the improved separator; Figure 2 is a perspective of a bottle within which is received the separator; Figure 3 is a view of the bottle shown in Fig. 2, a portion of said bottle being shown in section with the improved separator in position of service therein, and Figure 4 is a section through the disk members.

Referring specifically to the drawing, the improved separator is designated as an entirety by A, and the same includes disks $a$ and $b$, and a handle $c$ secured to the disks. The disk $b$ may comprise some flexible material, such as rubber. The disk $a$ acts as a reenforcing member for the member $b$ and as a means for maintaining the disk $b$ in a comparatively flat position or so that all portions of said disk $b$ tend to be maintained in the same plane, substantially as illustrated in Fig. 1. An eye member $d$ is secured to the disks in any improved manner and said eye member may be formed of the same flexible material that the disks are formed of, rubber, or a rubber composition, said eye member $d$ to be molded as an integral part of the disks $a$ and $b$. The handle $c$ may comprise an elongated wire member looped at one end for engagement with the eye member $d$ as shown at 1, and with the opposite end thereof hooked as shown at 2. Likewise the said wire may be bent as shown at 3, at an intermediate portion of its length, to provide a finger hold or a portion adapted to receive the end of a finger.

As illustrating one adaptation of the invention, I have shown in Figs. 2 and 3 milk bottles adapted to contain milk. The cap of the milk bottle may be removed by the hook end 2, after which the disk $b$ may be grasped in such a manner as to cup the same into the position shown in Fig. 2, and whereby said disk may be passed through the mouth 5 of the bottle and downwardly within the liquid content of said bottle. If we assume that the cream is at the line indicated by the dotted line 6, the disks would be lowered within the bottle to a position whereby the disk $b$ may again assume its plane position and an upward pull upon the handle will cause the rim of said disk to tightly engage the inner surface 7 of the bottle with the result that said disk will separate the cream from the milk. When in this position it is possible to pour the cream through the mouth of the milk bottle without disturbing the milk within the bottle and beneath the disk $b$.

The device not only is very efficient as a means for separating cream from milk, but the construction is such that it is absolutely sanitary, being free from any crevices in which a germ might find lodgement. The eye member $d$ as has been described above is made an integral part of the disk members $a$ and $b$. In this regard it is far superior to methods now employed that I am aware of.

I claim:

A separator comprising a disk of flexible material having a central thickened portion and an eye integral therewith and a handle connected to the eye.

In testimony whereof, I do affix my signature.

LILLIAN SLAVEN.